United States Patent [19]
Gapco

[11] Patent Number: 5,266,067
[45] Date of Patent: Nov. 30, 1993

[54] SELF-RELEASING TENSIONER

[75] Inventor: Brian E. Gapco, Birmingham, Mich.

[73] Assignee: Federal-Mogul Corporation, Southfield, Mich.

[21] Appl. No.: 951,518

[22] Filed: Sep. 25, 1992

[51] Int. Cl.⁵ ............................................. F16H 7/10
[52] U.S. Cl. ..................................... 474/112; 474/135
[58] Field of Search ................ 474/112, 117, 133, 135

[56] References Cited

U.S. PATENT DOCUMENTS

| | | | |
|---|---|---|---|
| 4,618,335 | 10/1986 | Brandenstein et al. | 474/133 X |
| 4,824,421 | 4/1989 | Komorowski | 474/112 X |
| 4,832,665 | 5/1989 | Kadota et al. | 474/112 |
| 4,834,694 | 5/1989 | Martin | 474/135 |
| 4,889,520 | 12/1989 | Brandenstein et al. | 474/135 |
| 4,904,230 | 2/1990 | Kawashima et al. | 474/112 |
| 4,917,655 | 4/1990 | Martin | 474/112 |
| 4,923,435 | 5/1990 | Kadota et al. | 474/135 X |

Primary Examiner—Ramon S. Britts
Assistant Examiner—Roger J. Schoeppel
Attorney, Agent, or Firm—Lawrence J. Shurupoff

[57] ABSTRACT

A tensioner includes a mechanism for presetting a biasing force for tensioning a belt or chain with a predetermined force. A locking and release mechanism maintains the tensioner in a locked or preset condition prior to installation and automatically releases the preset tensioning force during installation of the tensioner to a mounting surface.

10 Claims, 4 Drawing Sheets

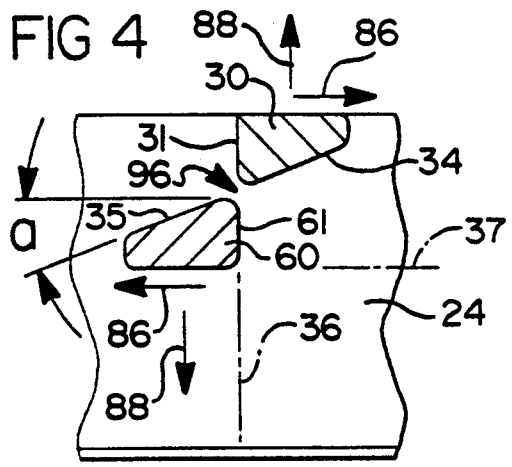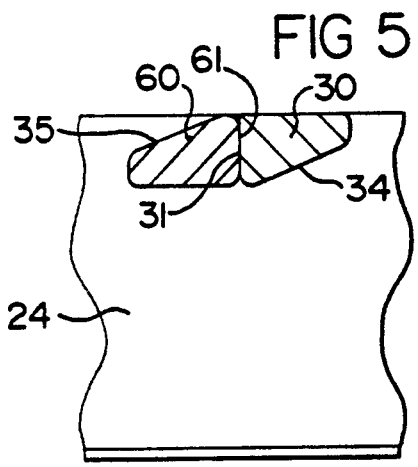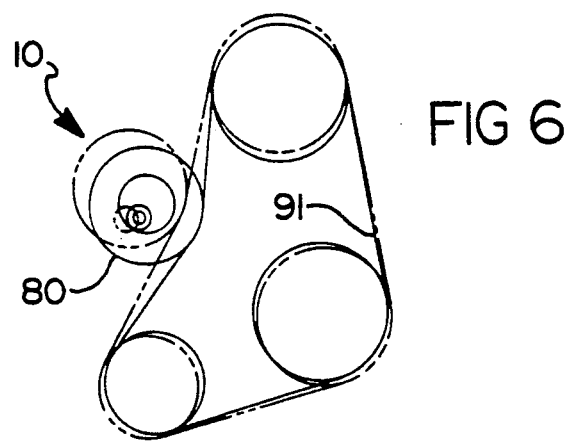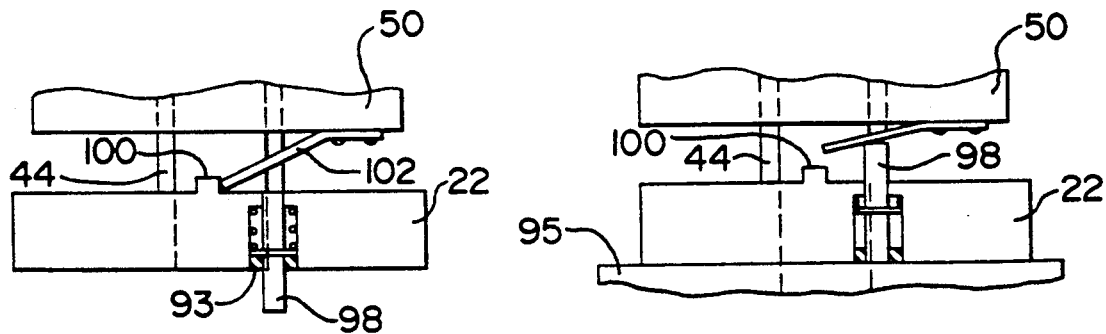

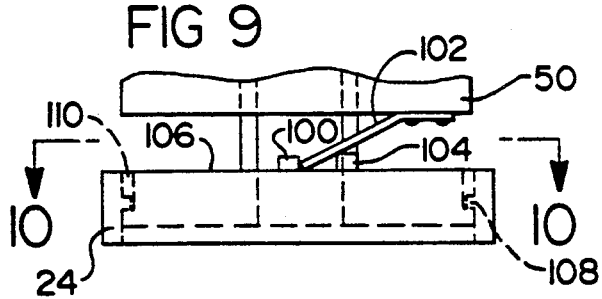
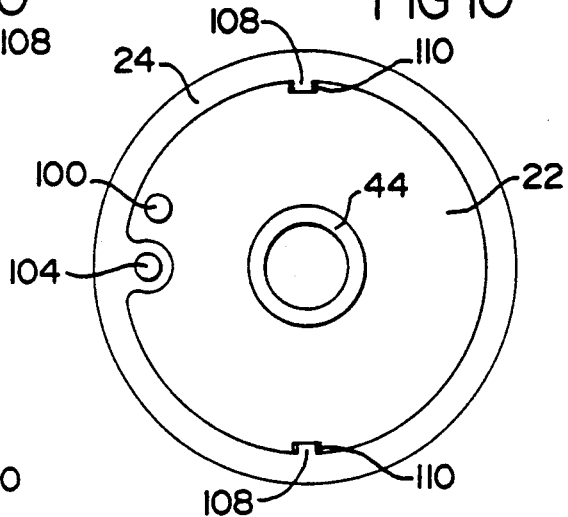
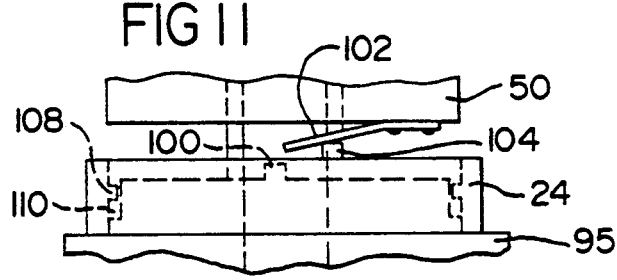
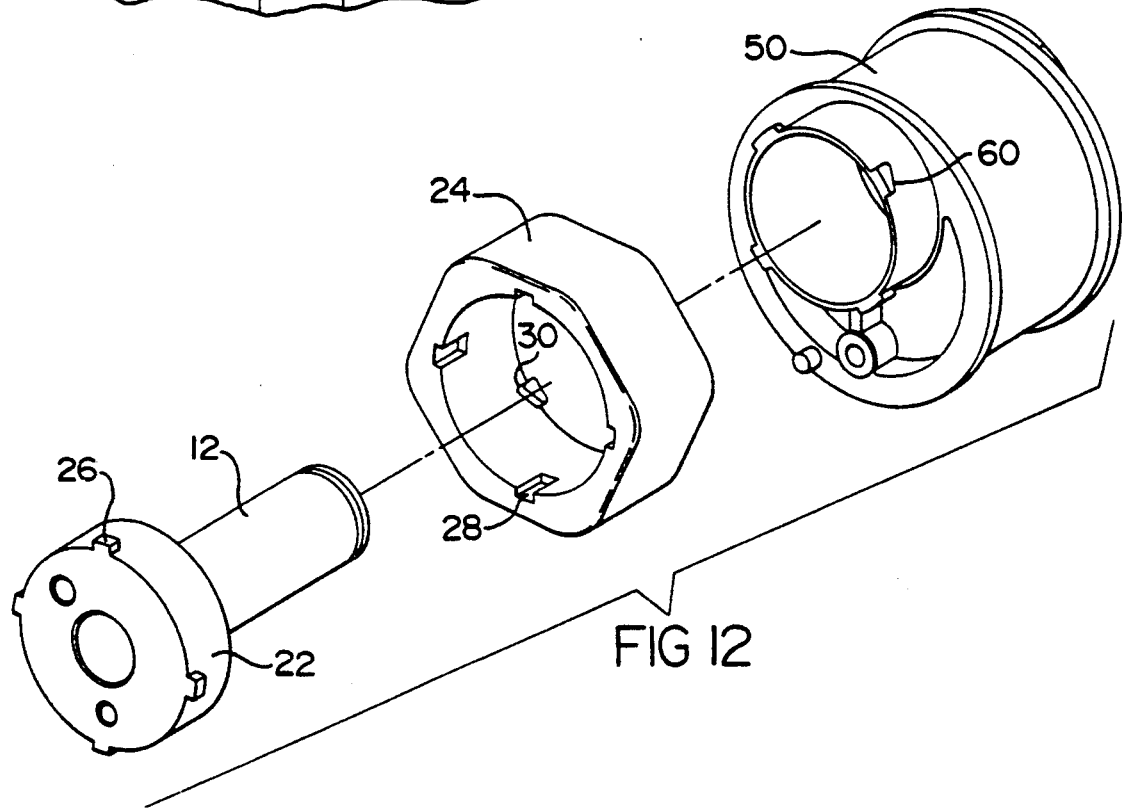

SELF-RELEASING TENSIONER

BACKGROUND OF THE INVENTION

1. Field of the Invention

The present invention relates generally to a belt or chain tensioning device and particularly concerns such a device which automatically releases a preset biasing force during installation.

2. Description of Prior Developments

Belt tensioning devices are well known and exist in numerous forms. A common arrangement includes a tensioning member, commonly a torsion spring, which urges a belt-tensioning idler pulley against an endless belt to control the tension in the belt and to maintain the engagement of the belt with its associated pulleys. It is necessary to control belt tension in order to prevent the belt from slipping about the pulleys over which the belt travels and for controlling belt wear, and often to maintain the angular relationship among the pulleys of synchronous drive systems.

Some tensioning devices are provided to manufacturers in a biased or spring-loaded state for facilitating installation and assembly within chain or belt driven systems. Such devices may include a prewound torsion spring which is held in a biased state between a mandrel and a pulley hub.

A spring release mechanism provided for allowing an installer to manually release the preset spring force between the mandrel and hub after the tensioning device has been installed within a belt driven system such as a timing belt assembly or automotive accessory drive system. Actuation of the release mechanism permits the hub to drive a tensioning pulley against an endless belt or the like. Examples of such release mechanisms are shown in U.S. Pat. No. 4,808,148 which discloses a ratchet and pawl release mechanism and U.S. Pat. No. 4,832,665 which discloses a grenade pin type release mechanism.

Although such prior release mechanisms perform adequately for their intended purposes, there have been instances where an installer has inadvertently omitted releasing the spring tension by forgetting to actuate the release mechanism. In these cases, the belt tension is not adequately controlled or maintained. This can lead to premature belt failure or poor belt performance. In some cases, this can lead to further damage such as valve failure in the case of a belt-driven timing mechanism. Moreover, grenade pin release mechanisms create a waste problem once the pins have been removed. Although the pins can be recycled, this has not proven an attractive solution.

Accordingly, a need exists for a tensioning device which virtually ensures the release of a preset biasing force by automatically releasing this force during the installation of the tensioning device within an associated belt or chain-driven system.

SUMMARY OF THE INVENTION

The present invention has been developed to satisfy the needs noted above and therefore has as an object the provision of a tensioner for a belt or chain driven system which automatically releases a preset biasing force upon installation of the tensioner.

Another object of the invention is to disengage a pair of abutting locking members with a release force provided by the driving force of a fastener used to mount the tensioner to its mounting surface.

Still another object of the invention is to automatically release the force of a prewound torsion spring during the mounting or installation of a tensioner so as to allow the spring to partially unwind and thereby drive a hub and pulley subassembly into engagement with an endless belt or chain.

Briefly, these objects are achieved by providing a locking and release mechanism between a relatively fixed mandrel and a pivotable pulley hub. The mechanism may include a locking and release collar which is splined to and axially slidable over the mounting mandrel. The collar may include one or more circumferentially spaced teeth adapted for selective engagement with coacting teeth provided on the pulley hub.

Prior to installation, the teeth on the collar are axially biased by a wave spring into engagement with the teeth on the mandrel so as to prevent relative rotation therebetween. In this condition, an end portion of the collar axially project beyond the end face of the mandrel for abutting engagement with an installation mounting surface.

As the prewound tensioner is bolted or otherwise secured to its mounting surface during installation, the axial biasing force of the wave spring is overcome by the axial clamping force applied by the mounting bolt or the like. This force causes the teeth on the collar to axially slide out of engagement with the teeth on the hub.

This sliding disengagement action releases the hub for free rotation about the fixed mandrel and biased engagement with a coacting belt or chain. In this manner, the prewound tensioner. is automatically released into predetermined, preset biased engagement with the belt or chain by the simple act of installation.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 4 is a fragmental sectional view taken along line 4—4 of FIG. 2;

FIG. 5 is a view similar to FIG. 4 showing the toothed engagement between the collar and hub prior to installation;

FIG. 6 is a schematic view of the tensioner applied to an accessory drive belt of an automobile;

FIGS. 7 and 8 are fragmental views of an alternate form of release mechanism;

FIGS. 9, 10 and 11 are fragmental views of another embodiment of release mechanism with FIG. 10 taken along line 10—10 of FIG. 9; and FIG. 12 is a simplified perspective view showing the details of the splined engagement between the mandrel and collar and the toothed engagement between the collar and hub of the tensioner assembly of FIGS. 1, 2 and 3.

DETAILED DESCRIPTION OF THE PREFERRED EMBODIMENTS

The invention will now be described in conjunction with FIGS. 1(a) through 3 which depict a tensioner assembly 10 for applying tension to a belt, chain or the like. The tensioner assembly includes a tubular mandrel 12 having a longitudinal bore 14 formed therethrough for receiving a mounting member such as a threaded fastener 16.

Figure 2:
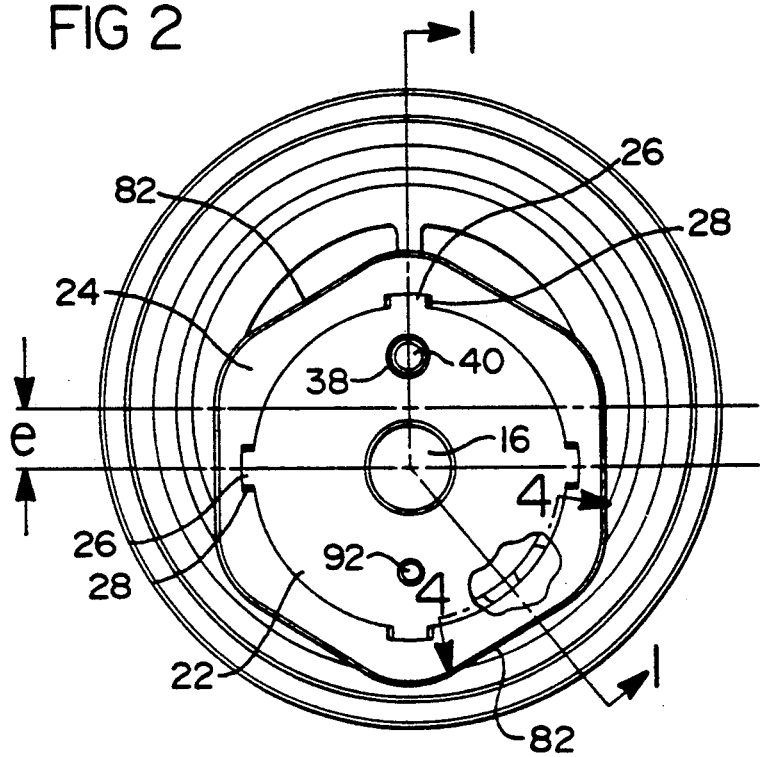
FIG. 2 is a right end elevation view of FIG. 1.
Figure 3:
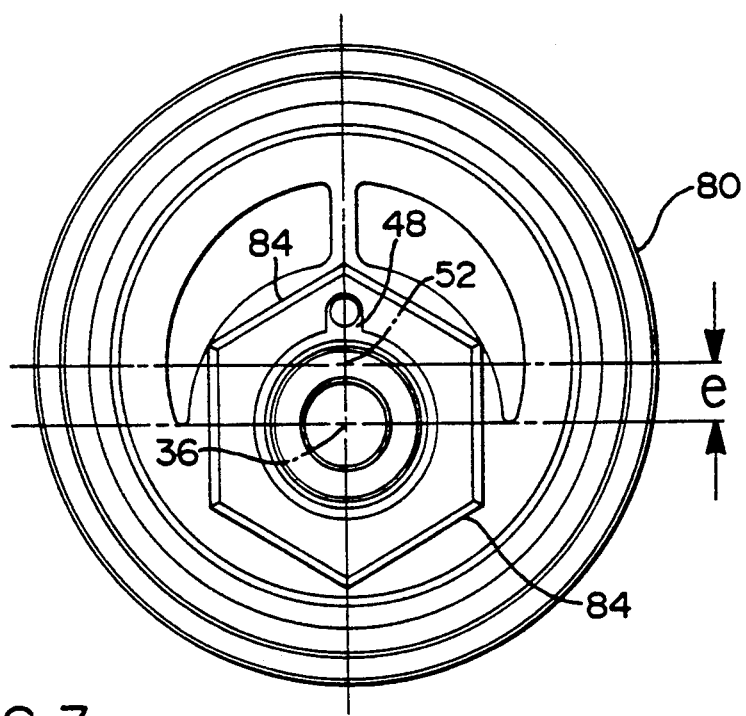
FIG. 3 is a left end elevation view of FIG. 1.

Mandrel 12 is formed with a radial end face 18 which is adapted to be rigidly clamped to a flat mounting surface by threaded fastener 16. A radially extending flange 22 is formed on mandrel 12 adjacent end face 18 for supporting an annular collar 24 thereon. As seen in FIG. 2, flange 22 is formed with a plurality of radially outwardly projecting splines 26 which are aligned within axial spline grooves 28 formed within collar 24.

Collar 24 is axially slidable with respect to central axis 36 of mandrel 12 for providing a locking and release action as discussed below. A plurality of circumferentially spaced teeth or projections 30 is provided along the inner diameter 32 of collar 24. As seen in FIG. 4, teeth 30 include cam abutment surfaces 34 which are inclined, offset or skewed from the circumferential direction 37 by angle A.

A recess or bore 38 is formed within flange 22 of mandrel 12 for receiving one end 40 of torsion spring 42. Torsion spring 42 encircles and extends axially along the outer surface of tubular body 44 of mandrel 12. The other end 46 of torsion spring 42 is seated within a groove or recess 48 formed in pulley hub 50.

Hub 50, which may be formed of a plastic material, is pivotally or rotatably mounted around mandrel 12 with its axis of rotation 52 being eccentrically offset from the mandrel axis 36 by an amount e, as is well known in the art. A cylindrical bore 54 formed within one end face 56 of hub 50 provides a bearing surface or bushing between the hub and mandrel. A similar cylindrical bearing surface is provided along a stepped cylindrical surface 57 formed in mandrel flange 22.

An axially-extending bore 58 is formed within hub 50 for encircling and captively retaining the body of torsion spring 42 between the mandrel 12 and hub 50. Hub 50 further includes a plurality of circumferentially spaced teeth or projections 60 which are engageable with the teeth 30 formed on collar 24. A simplified perspective view of the relative locations of the splined connection between the mandrel and collar and toothed engagement between the collar and hub is shown in FIG. 12.

At least one biasing member such as annular wave spring 62 is disposed between the hub 50 and collar 24 for axially biasing the collar 24 toward the end face 18 of the mandrel. The axial travel of collar 24 over mandrel flange 22 is limited by the abutment of radial face 64 on collar 24 with the interior radial faces of 66 of splines 26. The reaction force to the wave spring or springs 62 is provided by a clip ring 68 which prevents axial disengagement between the mandrel and hub.

Figure 1A:
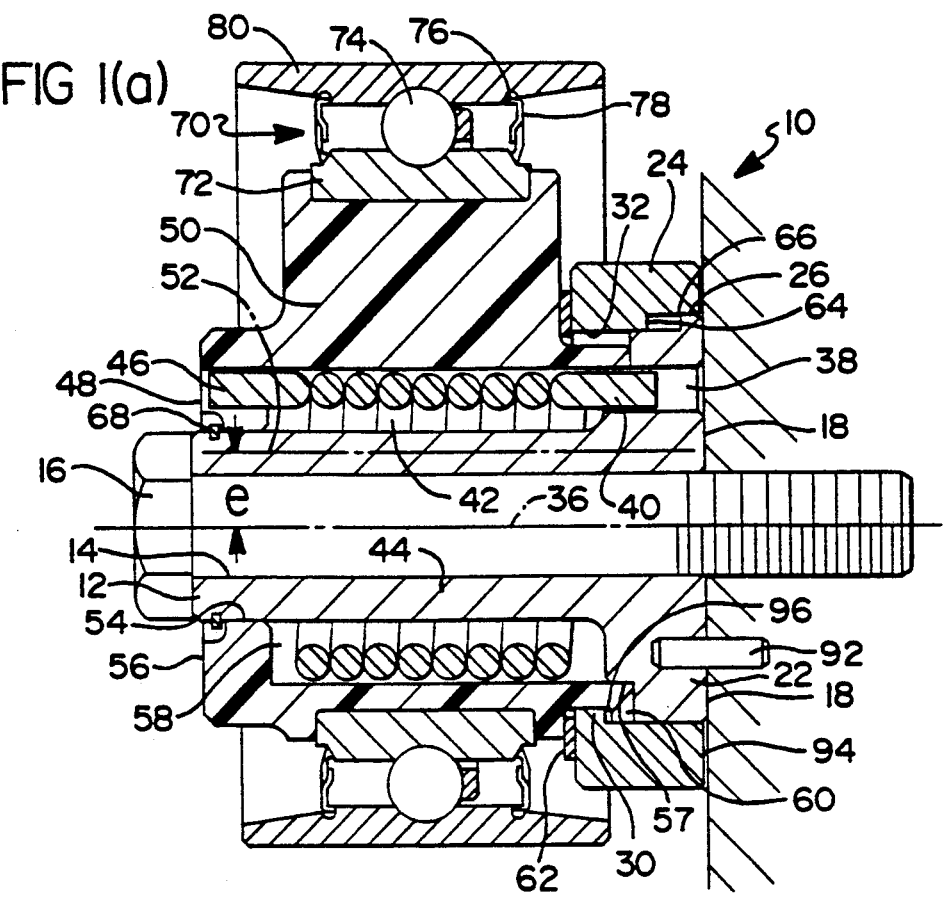
FIG. 1(a) is a view in axial section, taken along line 1—1 of FIG. 2, showing a preferred embodiment of the present invention mounted to a mounting surface.
Figure 1B:
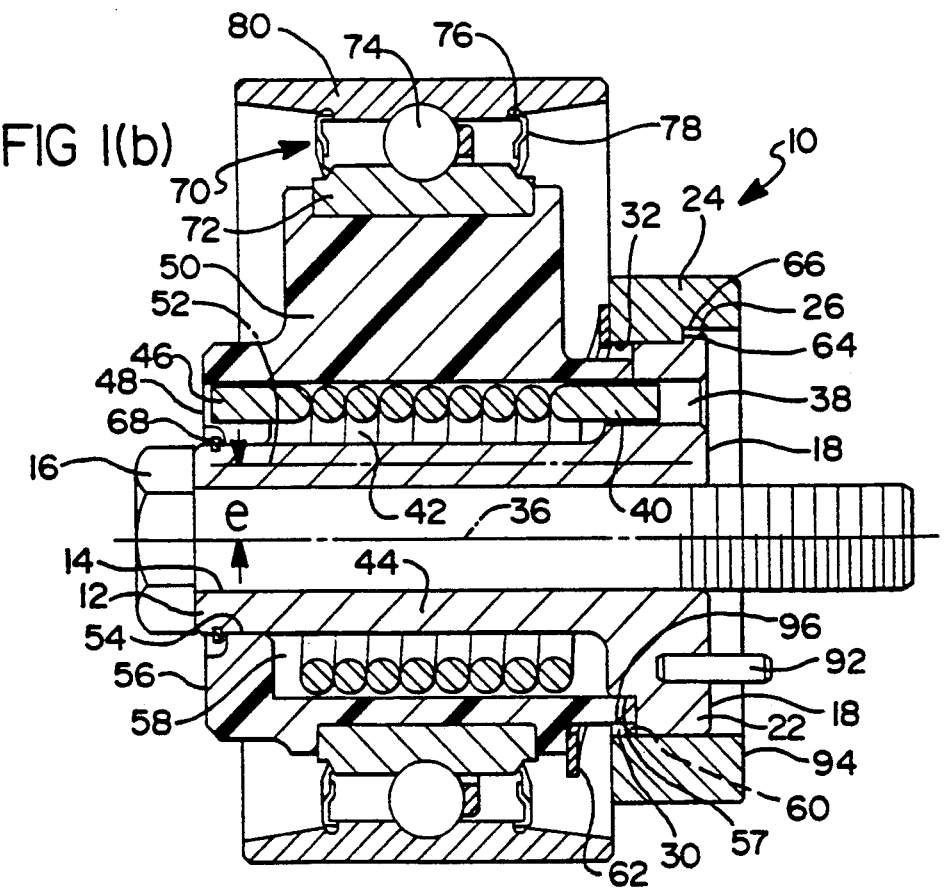
FIG. 1(b) is a view of FIG. 1(a) prior to mounting the present invention to a mounting surface.

It can be appreciated that, prior to mounting, the collar 24 will project axially beyond end face 18 due to the axial biasing force of wave spring 62. The axial projected position of end face 18 is shown in FIG. 1(b). In this state, as shown in FIG. 5, the teeth 30 of collar 24 are at least partially axially coextensive with and engaged with the teeth 60 on hub 50.

This toothed engagement resists relative rotation or pivotal movement in one direction between the mandrel 12 and hub 50 via the nonrotatable splined interconnection between the collar 24 and mandrel flange 22. That is, teeth 30 and 60 may be rotated away from one another by overcoming the tension of torsion spring 42, but torsion spring 42 is prevented from rotating the hub in the opposite direction due to the abutment between axially-extending faces 31, 61 on teeth 30, 60.

A bearing assembly 70 is mounted to the outer surface of hub 50. Bearing assembly 70 includes an inner race 72, a plurality of rolling elements such as balls 74 circumferentially spaced by a bearing cage 76 and sealed by bearing seals 78. The outer race of the bearing assembly may take the form of a belt or chain engaging pulley 80.

Torsion spring 42 may be prewound or preset with a predetermined tension by rotating the hub through a predetermined arc with respect to the mandrel. This presetting may be carried out prior to shipping and installation by engaging a first torquing tool, such as a wrench or the like, with a pair of opposed flat surfaces 82 formed on collar 24 and by engaging a second torquing tool with a pair of opposed flat surfaces 84 (FIG. 3) formed on the opposite end of the hub 50.

By rotating the collar 24 with one torquing tool while holding the hub fixed with the other tool, the mandrel is rotated through the mandrel splines 26 which receive torque through engagement against the side walls of collar grooves 28. As this rotation takes place, relative circumferentially directed sliding occurs between the abutting cam surfaces 34, 35 of teeth 30 and teeth 60 as represented by directional arrows 86 in FIG. 4.

At the same time, relative axial displacement takes place between the teeth 30, 60 as indicated by directional arrows 88 in FIG. 4. Sliding contact is maintained between the teeth 30, 60 during this presetting operation by the axial biasing force provided by wave spring 62. During this prewinding rotation, wave spring 62 is axially compressed as collar 24 is driven toward hub 50 by the axially directed component of the sliding wedging force generated between the respective cam surfaces 34, 35 of teeth 30, 60.

Once a pair of contacting cam surfaces 34, 35 on teeth 30, 60 circumferentially clear one another, the wave spring 62 forces the collar to axially slide over the mandrel flange 22 toward end face 18 thereby returning the collar to its original axially projecting position. Thus, as the collar 24 and mandrel 12 are rotated about the hub 50, the collar axially reciprocates over the mandrel flange 22 thereby providing a ratcheting action between the hub and mandrel.

That is, once the wave washer forces the faces 31 of collar teeth 30 back into engagement with faces 61 of the hub teeth 60 after an increment of rotation against the resistance of torsion spring 42, the resulting circumferentially biased engagement prevents the torsion spring from rotating the mandrel and hub in the reverse direction. This provides a locking or anti-rotation action between the mandrel and hub.

Once the hub is sufficiently rotated with respect to the mandrel to achieve a predetermined tension within torsion spring 42, the torquing tools are removed from the tension assembly 10 leaving the hub and mandrel rotationally preset and locked in a pretensioned condition. Circumferential rotation is prevented between the mandrel and hub by biased abutment between the radially projecting and axially-extending planar end faces 31, 61 formed respectively on teeth 30, 60 as shown in FIG. 5. At this point, the tensioner assembly may be shipped to an installer for use in a belt or chain driven system.

In order to mount the tensioner assembly to a mounting surface, such as an engine block or the like, an installer simply clamps the mandrel to the mounting surface by threading fastener 16 into a threaded bore formed in the mounting surface. An anti-rotation and positioning pin 92 may be provided on mandrel end face 18 or collar end face 94 for insertion into another bore formed in the mounting surface.

As the fastener 16 is torqued down, the end face 94 of collar 24 abuts the mounting surface. At this point, the collar teeth 30 begin to axially slide against and disengage from the hub teeth 60 as wave spring 62 is axially compressed. Continued torquing of fastener 16 further forces the end face 18 of mandrel 12 against the mounting surface so as to rigidly mount the mandrel to the mounting surface. Just prior to abutment of end face 18 with the mounting surface, the end faces 31, 61 of teeth 30, 60 disengage one another thereby providing an axial clearance 96 between end faces 31, 61 which permits relative circumferential rotation between the hub and mandrel.

At this point, the hub is free to rotate about the mandrel under the driving force of torsion spring 42. As seen in FIGS. 1 and 6, end portion 46 of torsion spring 42 drives the hub eccentrically about axis 36 so as to force pulley 80 into engagement with a belt or chain 91. The phantom view in FIG. 6 shows the tensioner assembly prior to automatic release, while the solid view represents the tensioner assembly after its installation and automatic release.

Thus, the tensioner assembly 10 is automatically released into biased engagement with a belt or chain by the simple act of mounting the assembly to a mounting surface. Once released, minor vibrations and oscillations between the hub and mandrel may be effectively damped by the resistance to rotation provided by wave spring 62 and clip ring 68.

An alternate release mechanism is shown in FIG. 7 wherein an axially-biased slidable pin 98 is retained within a bore in mandrel flange 22 with a plug 93. At least one raised boss or detent 100 projects axially from mandrel flange 22 toward hub 50 and serves as a stop against which the free end of leaf spring 102 abuts. The other end of the leaf spring 102 is fastened to the hub 50.

The interaction between the leaf spring 102 and boss 100 is similar to that of the aforementioned teeth 30, 60 in that the leaf spring and boss provide for an anti-rotation locking action between the mandrel and the hub and for the automatic release and relative rotation of the hub and mandrel upon mounting and installation. In particular, as the tensioner assembly 10 is fastened to a mounting surface 95 as seen in FIG. 8, pin 98 will engage the mounting surface and be displaced toward the hub 50. The pin 98 is aligned with the leaf spring 102 such that as the pin moves toward hub 50, the pin forces the free end of the leaf spring 102 out of engagement with boss 100, thereby freeing the hub and mandrel for relative rotation.

A somewhat similar type of release mechanism is shown in FIGS. 9, 10 and 11 wherein a fixed boss 104 is provided on the inner face 106 of axially slidable collar 24 for engaging and releasing leaf spring 102 mounted to hub 50. Splines 108 on collar 24 are axially slidable within grooves 110 formed in flange 22 of mandrel 12 to axially key these members to one another. As seen in FIG. 11, as the assembly is mounted to mounting surface 95, as described previously, boss 104 releases leaf spring 102 from engagement with boss 100 thereby allowing the hub 50 to rotate eccentrically about the mandrel.

Obviously, numerous modifications and variations of the present invention are possible in the light of the above teachings. It is therefore to be understood that within the scope of the appended claims, the invention may be practiced otherwise than as specifically described herein.

What is claimed is:

1. A tensioner, comprising;
   mounting means for mounting said tensioner to a support surface;
   a hub operatively associated with said mounting means;
   biasing means operatively associated with said hub for biasing said hub for eccentric movement about said mounting means;
   a pulley rotatably supported on said hub;
   locking means operatively associated with said hub and with said mounting means for preventing said eccentric movement of said hub about said mounting means; and
   automatic release means operatively associated with said locking means and said mounting means for moving said locking means and automatically releasing said locking means in automatic response to the mounting of said mounting means to said mounting surface.

2. The tensioner of claim 1, wherein said mounting means comprises a tubular mandrel.

3. The tensioner of claim 1, wherein said biasing means comprises a torsion spring having one end portion connected to said mounting means and an opposite end portion connected to said hub.

4. The tensioner of claim 1, wherein said locking means comprises at least one abutment surface provided on said mounting means and at least one abutment surface operatively associated with said mounting means, said abutment surfaces being adapted to selectively abut one another so as to prevent said eccentric movement of said hub about said mounting means.

5. The tensioner of claim 1, wherein said release means comprises a collar slidably mounted on said mounting means.

6. The tensioner of claim 5, wherein said collar comprises first engagement means, and wherein said hub comprises second engagement means selectively engageable with said first engagement means.

7. The tensioner of claim 6, wherein said first engagement means comprises a plurality of teeth formed on said collar and wherein said second engagement means comprises a plurality of teeth formed on said hub.

8. The tensioner of claim 1, wherein said locking means comprises a flexible projection extending between said mounting mean and said hub.

9. The tensioner of claim 1, wherein said release means comprises a rigid axially-projecting member extending between said mandrel and said hub.

10. A method of automatically releasing a preset tensioner into engagement with a belt or chain during installation of the tensioner to a mounting surface, said tensioner comprising mounting means for mounting said tensioner to said mounting surface, a hub, a pulley rotatably supported on said hub, biasing means for biasing said pulley against said belt of chain, locking means for preventing movement of said hub about said mounting means, and automatic release means for releasing said locking means, and wherein said method comprises:

mounting said tensioner to said mounting surface with said mounting means;

moving said automatic release means in automatic response to said mounting of said tensioner to said mounting surface; and automatically releasing said automatic release means by said moving said automatic release means such that said pulley is driven into engagement with said belt or chain by said biasing means.

* * * * *